US011873105B2

(12) United States Patent
Tranier et al.

(10) Patent No.: US 11,873,105 B2
(45) Date of Patent: Jan. 16, 2024

(54) FRAME COMPONENT WITH VARIABLE WALL THICKNESS

(71) Applicant: Safran Seats USA LLC, Gainesville, TX (US)

(72) Inventors: Romain Tranier, Costa Mesa, CA (US); Reza Mansouri, Costa Mesa, CA (US); Charles Michael Parker, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 42 days.

(21) Appl. No.: 17/610,667

(22) PCT Filed: May 30, 2019

(86) PCT No.: PCT/US2019/034717
§ 371 (c)(1),
(2) Date: Nov. 11, 2021

(87) PCT Pub. No.: WO2020/242484
PCT Pub. Date: Dec. 3, 2020

(65) Prior Publication Data
US 2022/0242576 A1    Aug. 4, 2022

(51) Int. Cl.
*B60N 2/68* (2006.01)
*B64D 11/06* (2006.01)
*B60N 2/22* (2006.01)

(52) U.S. Cl.
CPC ............ *B64D 11/0649* (2014.12); *B60N 2/68* (2013.01); *B60N 2/22* (2013.01)

(58) Field of Classification Search
CPC ...................................................... B60N 2/68
See application file for complete search history.

(56) References Cited

U.S. PATENT DOCUMENTS 5,362,132 A * 11/1994 Griswold ............... B60N 2/688
297/483
5,988,756 A * 11/1999 Aufrere .................... B60N 2/68
72/58

(Continued)

FOREIGN PATENT DOCUMENTS

| WO | 2016128524 A1 | 8/2016 | |
|---|---|---|---|
| WO | 2019017834 A1 | 1/2019 | |
| WO | WO-2021123324 A1 * | 6/2021 | ........... B60N 2/4214 |

OTHER PUBLICATIONS

International Patent Application No. PCT/US2019/034717, International Search Report and Written Opinion dated Feb. 25, 2020.

(Continued)

*Primary Examiner* — Timothy J Brindley
(74) *Attorney, Agent, or Firm* — Kilpatrick Townsend & Stockton LLP

(57) ABSTRACT

Described is a frame component for a passenger seat assembly. The frame includes a tubular frame component having a first portion and a second portion. The bent portion bends the frame at a non-zero angle within a plane. The tubular frame component includes a variable inner diameter such that the first portion of the tubular frame component has a first wall thickness and the bent portion of the tubular frame component has a second wall thickness that is different from the first wall thickness.

16 Claims, 2 Drawing Sheets

(56) References Cited

U.S. PATENT DOCUMENTS

| | | | | |
|---|---|---|---|---|
| 6,767,067 | B2* | 7/2004 | Fourrey | B29C 70/44 |
| | | | | 297/452.2 |
| 7,905,544 | B2* | 3/2011 | Grutzeck | G01D 11/30 |
| | | | | 297/216.12 |
| 8,506,015 | B2* | 8/2013 | Le | B64D 11/06 |
| | | | | 297/452.2 |
| 9,340,135 | B2* | 5/2016 | Sakkinen | B60N 2/4235 |
| 10,494,104 | B2* | 12/2019 | Jaeger | B64D 11/0648 |
| 10,640,025 | B2* | 5/2020 | Suzuki | B60N 2/20 |
| 10,793,035 | B2* | 10/2020 | Kawauchi | B60N 2/68 |
| 2005/0248200 | A1* | 11/2005 | Pradier | B60N 2/2222 |
| | | | | 297/378.1 |
| 2006/0201227 | A1* | 9/2006 | Lepre | B62D 21/11 |
| | | | | 72/370.14 |
| 2011/0163587 | A1 | 7/2011 | Kmeid et al. | |
| 2019/0299827 | A1* | 10/2019 | Kinard | B60N 2/7017 |

OTHER PUBLICATIONS

Europe Patent Application No. 19731503.9, Office Action (Communication pursuant to Article 94(3) EPC), dated Jun. 22, 2023.

\* cited by examiner

FRAME COMPONENT WITH VARIABLE WALL THICKNESS

FIELD OF THE INVENTION

The field of the invention relates to passenger seat assemblies, and more particularly to frame components for passenger seat assemblies having a variable wall thickness.

BACKGROUND

Passenger seat assemblies for vehicles include secondary frame components that are bent in one or more planes and support other seating components such as cushions, pads, in-flight entertainment monitors, etc. Secondary frame components include, but are not limited to, backrest frame components, luggage bars, etc. Secondary frame components may be directly or indirectly connected to one or more base-frame tubes that are capable of providing support when the seat experiences stresses caused by an individual in the seat during a crash-landing condition or other activities. Secondary frame components traditionally have a constant thickness to meet various strength and stiffness requirements. However, such frame components are relatively heavy, expensive to produce, and have limited formability to meet design requirements.

SUMMARY

The terms "invention." "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a seat base and a backrest connected to the seat base. The backrest includes a frame component that includes a tubular frame component having a variable inner diameter such that a first portion of the tubular frame component has a first wall thickness and a second portion of the tubular frame component has a second wall thickness that is different from the first wall thickness.

In some embodiments, the first portion of the tubular frame component is a bent portion bending the frame at a non-zero angle within a plane defined by the backrest. In certain embodiments, the plane is a first plane, the backrest defines a second plane, the bent portion is a first bent portion, and the second portion of the tubular frame component is a second bent portion bending the frame at a non-zero angle within a second plane defined by the backrest. The backrest may include an upper end and a lower end, and the first portion at least partially forms the lower end of the backrest and the second portion at least partially forms the upper end of the backrest.

In certain embodiments, the tubular frame component further includes a third portion between the first portion and the second portion, and the third portion of the tubular frame component may include a third wall thickness that is greater than the first wall thickness and less than the second wall thickness. The first wall thickness and the second wall thickness may be between about 0.006 inches to about 0.25 inches. In some cases, the first wall thickness and the second wall thickness may be between about 0.01 inches and about 0.08 inches. The tubular frame component may include at least one of aluminum, magnesium, titanium, or steel.

According to certain embodiments of the present invention, a frame component for a passenger seat assembly includes a tubular frame component having an inner surface, an outer surface, a first portion, and a bent portion. A distance from the inner surface to the outer surface is a thickness of the tubular frame component, and the bent portion bends the frame at a non-zero angle within a plane. The thickness of the bent portion of the tubular frame component is different from the thickness of the first portion of the tubular frame component.

In certain embodiments, the thickness of the bent portion of the tubular frame component is greater than the thickness of the first portion of the tubular frame component. In various embodiments, the first portion is a non-bent portion of the tubular frame component. In some embodiments, the thickness of the tubular frame component is from about 0.006 inches to about 0.25 inches. In certain embodiments, the thickness of the tubular frame component is from about 0.01 inches to about 0.08 inches.

In some embodiments, the bent portion is a first bent portion and the plane is a first plane, and the tubular frame component further includes a second bent portion bending the frame at a non-zero angle within a second plane. The thickness of the second bent portion of the tubular frame component may be different from the thickness of the first portion of the tubular frame component. In some embodiments, the first portion is between the first bent portion and the second bent portion. In various embodiments, the thickness of the second bent portion is greater than the thickness of the first portion and less than the thickness of the second bent portion.

According to certain embodiments of the present invention, a frame component for a passenger seat assembly includes a tubular frame component having a first portion and a bent portion bending the frame at a non-zero angle within a plane. The tubular frame component includes a variable inner diameter such that the first portion of the tubular frame component has a first wall thickness and the bent portion of the tubular frame component has a second wall thickness that is different from the first wall thickness.

In some embodiments, the bent portion is a first bent portion and the plane is a first plane, and the tubular frame component also includes a second bent portion bending the frame at a non-zero angle within a second plane. The second bent portion may include a third wall thickness. The third wall thickness may be less than at least one of the first wall thickness or the second wall thickness. The first portion may be between the first bent portion and the second bent portion, and the third wall thickness may be less than both the first wall thickness and the second wall thickness. In some embodiments, the first wall thickness and the second wall thickness are less than or equal to about 0.25 inches. In certain embodiments, the first wall thickness and the second wall thickness are less than or equal to about 0.08 inches In various embodiments, the frame comprises at least one of a backrest frame or a luggage bar frame.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a secondary frame component for passenger seats. While the secondary frame components are discussed for use with aircraft seats, they are by no means so limited. Rather, embodiments of the frame components may be used in passenger seats or other seats of any type or otherwise as desired.

Figure 1:
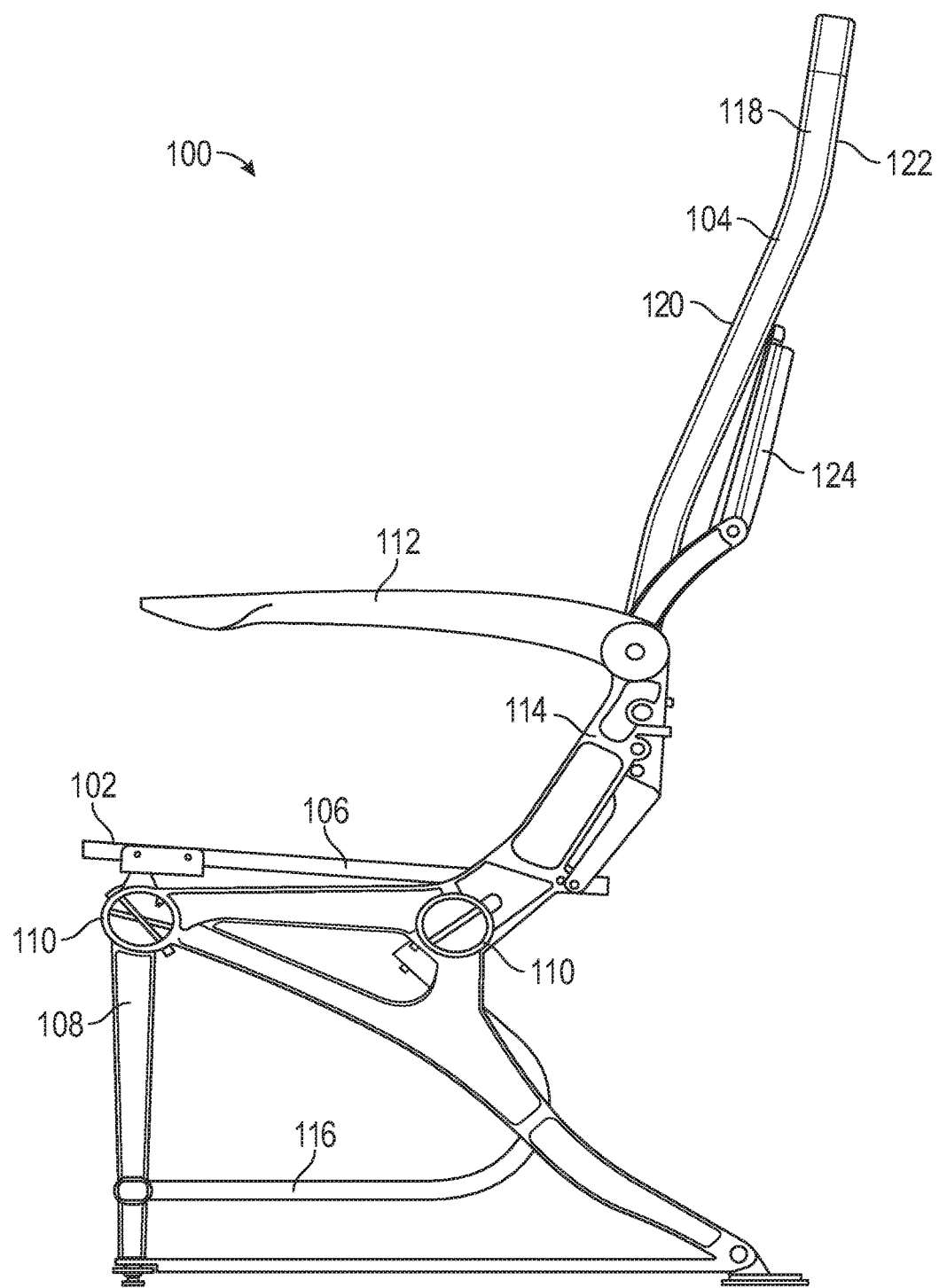
FIG. 1 is a side view of passenger seat assembly according to certain embodiments of the present invention.

As illustrated in FIG. 1, a passenger seat assembly 100 may include one or more seat bases 102 and one or more seat backs 104. The number of seat bases 102 and/or seat backs 104 should not be considered limiting on the current disclosure. In various examples, the number of seat backs 104 correspond with the number of passengers that the passenger seat is capable of carrying. In the example of FIG. 1, the passenger seat assembly 100 is capable of carrying one passenger, and accordingly has one seat back 104. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

The seat base 102 of the passenger seat assembly 100 generally includes a leg assembly 108 and at least one base frame tube 110. The base frame tube 110 is a primary tubular frame component of the passenger seat assembly 100, meaning that is one of the elements on the primary load path from the passenger (seat belt) to the aircraft floor (tracks). Secondary frame components are not on the primary load path but may provide other structural support. Whereas base frame tubes 110 are generally straight, other frame components such as secondary frame components may be bent into various shapes in one or more planes as discussed in detail below. The seat base 102 may also include a support frame 106, an armrest 112, a divider 114, a luggage bar 116, or other components. Cushioning (not illustrated) may be provided on any of the components of the seat base 102.

The seat back 104 is connected to the seat base 102, and is often pivotable relative to the seat base 102 such that the seat back 104 can be positioned in various positions such as a taxi-takeoff-landing (TTL) position, a reclined position, etc. The seat back 104 includes a frame component 118 having a forward side 120 and an aft side 122. In some cases, other components of the passenger seat assembly 100 such as a tray table 124, an in-flight entertainment monitor, or various other components may be supported on the seat back 104. Cushioning (not illustrated) may be provided on any of the components of the seat back 104.

Figures 2, 3:
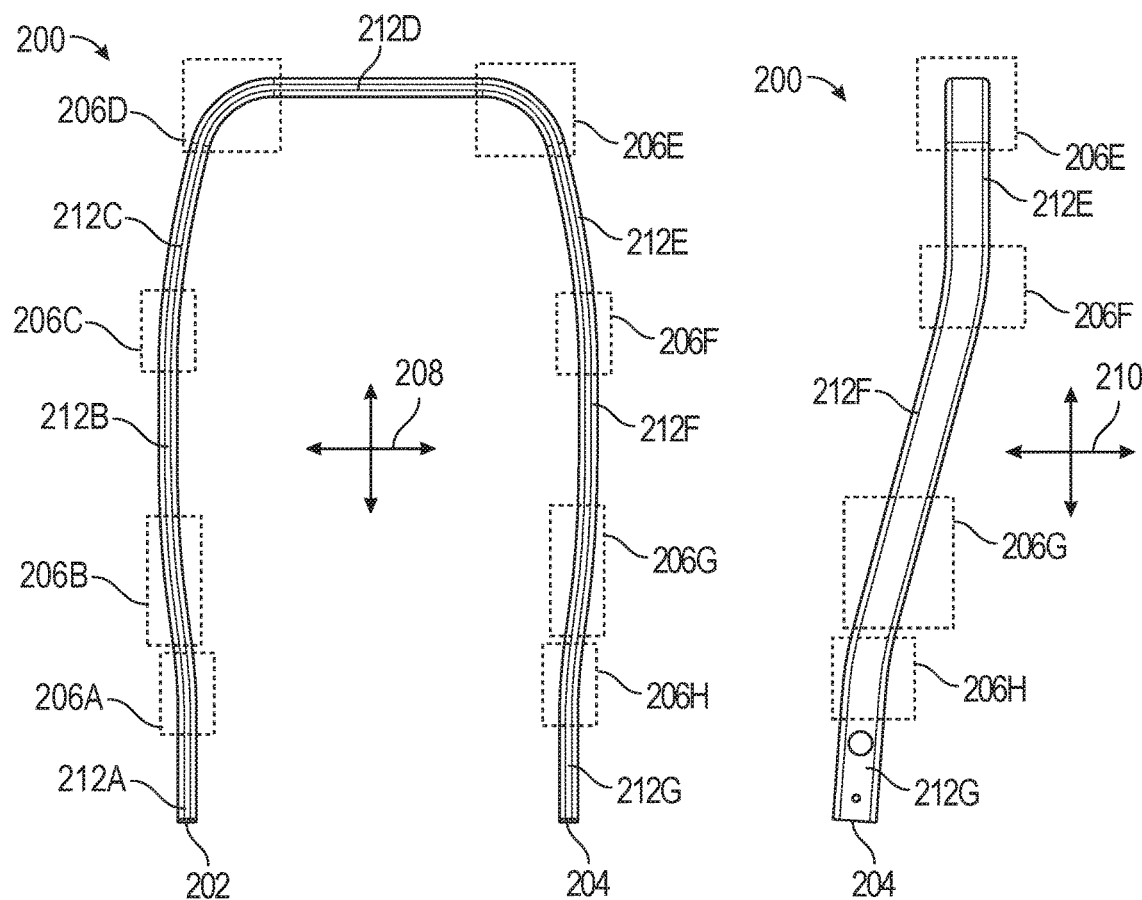
FIG. 2 is a front view of a tubular frame component according to certain embodiments of the present invention.
FIG. 3 is aside view of the frame component of FIG. 2.
Figure 4:
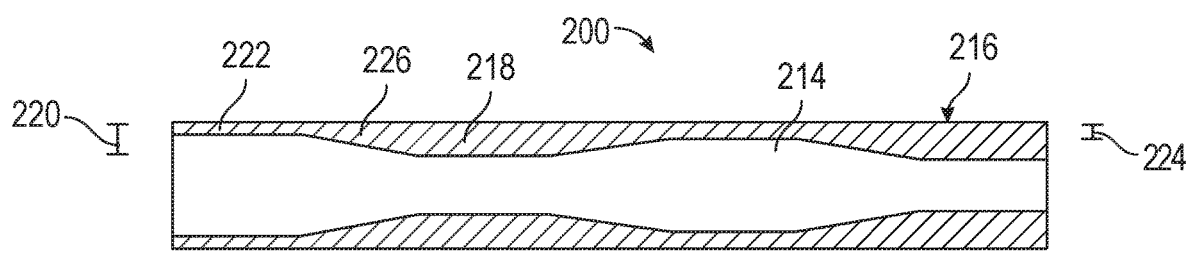
FIG. 4 is a sectional view of a portion of the frame component of FIG. 2.

FIGS. 2-4 illustrate an example of a tubular frame component 200. In the example of FIGS. 2-4, the tubular frame component 200 is illustrated as a frame component of the seat back 104, although in other examples the tubular frame component 200 may be utilized as various other frame components of the seat base 102 and/or the seat back 104 of the passenger seat assembly 100 as desired. The tubular frame component 200 may be constructed from various suitable materials including, but not limited to aluminum, stainless steel, other metallic materials, composite materials, and/or other suitable materials. The tubular frame component 200 may be formed by extrusion or other suitable processes as desired.

The tubular frame component 200 includes a first end 202 and a second end 204. As discussed in detail below, between the first end 202 and the second end 204, the tubular frame component 200 includes a first portion having a first wall thickness and a second portion having a second wall thickness that is different from the first wall thickness. In the example of FIGS. 2-4, the first end 202 and the second end 204 may be attached to the seat base 102 through various suitable mechanisms. Between the first end 202 and the second end 204, the tubular frame component 200 includes one or more bent portions 206 that bend the tubular frame component 200 at a non-zero angle within one or more planes. In the example of FIGS. 2-4, the tubular frame component 200 includes eight bent portions 206A-H; bent portions 206A-H bend the tubular frame component 200 at non-zero angles within a first plane 208 (see FIG. 2), and bent portions 206A-C and 206F-H bend the tubular frame component at non-zero angles within a second plane 210 (see FIG. 3). However, the number of bent portions, the number of planes in which the tubular frame component 200 is bent, and the shape of the tubular frame component 200 should not be considered limiting on the current disclosure.

The bent portions 206 may be adjacent to non-bent portions of the tubular frame component 200 and/or other bent portions 206. In some cases, a non-bent portion 212 of the tubular frame component 200 is adjacent to at least one bent portion 206. In the example of FIGS. 2-4, the tubular frame component 200 includes seven non-bent portions 212A-G. However, the number of non-bent portions 212 should not be considered limiting on the current disclosure, and in some examples, the non-bent portions may be omitted from the tubular frame component 200.

As best illustrated in FIG. 4, the tubular frame component 200 includes an inner surface 214 and an outer surface 216. A distance from the inner surface 214 to the outer surface 216 is a wall thickness of the tubular frame component 200, and the tubular frame component 200 has a variable wall thickness such that at least two portions having a different wall thicknesses. In the example of FIG. 4, a first portion 218 has a first wall thickness 220 and a second portion 222 has a second wall thickness 224 that is less than the first wall thickness 220. In some examples, the outer surface 216 has a constant outer diameter and the inner surface 214 has a variable inner diameter such that the tubular frame component 200 has a variable wall thickness. Optionally, a transition portion 226 having an increasing or decreasing wall thickness is provided between the first portion 218 and the second portion 222, although it need not be in other examples. In certain embodiments, the wall thickness of the tubular frame component may be from about 0.006 inches to about 0.25 inches. In certain embodiments, the wall thickness of the tubular frame component may be from about 0.01 inches to about 0.08 inches.

Between the first end 202 and the second end 204, the tubular frame components 200 may have various patterns or arrangements of wall thicknesses as desired, and the wall thickness pattern illustrated in FIG. 4 should not be considered limiting on the current disclosure. As one non-limiting example, in some cases, the tubular frame component 200 may have a variable wall thickness such that the wall thickness of one of the bent portions 206 (e.g., bent portion 206A) is greater than the thickness of one of the non-bent portions 212 (e.g., non-bent portion 212A). As another non-limiting example, in various cases, the tubular frame component 200 may have a variable wall thickness such that the thickness of one of the bent portions (e.g., bent portion 206A) is greater than the thickness of another one of the bent portions (e.g., bent portion 206D). In other examples, the tubular frame component 200 may have a variable wall thickness such that a plurality of wall thicknesses are utilized. As a non-limiting example, the wall thickness of the bent portion 206D may be less than the wall thickness of the bent portion 206C, and the wall thickness of the bent portion 206C may be less than the wall thickness of the bent portion 206A. As another non-limiting example, the wall thickness of the non-bent portion 212D may be less than the wall thickness of the non-bent portion 212C, and the wall thickness of the non-bent portion 212C may be less than the wall thickness of the bent portion 206D. Various other patterns or arrangements of wall thicknesses may be utilized as desired.

Compared to frame components with a uniform wall thickness, the tubular frame component 200 with the variable wall thickness has increased formability and manufacturability into various shapes and configurations as desired while meeting various mechanical requirements (e.g., strength) at a lower overall weight. For example, portions of the tubular frame component 200 subject to relatively high strains (e.g., bent portions, portions connecting to other seat components, etc.) may have an increased wall thickness to provide sufficient strength for formability, and areas subject to less strains (e.g., non-bent portions, portions not connected to other seat components, etc.) may have a reduced thickness to reduce the weight of the tubular frame component. The increased formability may allow for more complex shaping of the tubular frame component 200 without failure, and may also allow for materials to be used as the tubular frame component 200 (e.g., high strength aluminum alloys) that previously could not be used. The decreased weight of the tubular frame component 200 may provide cost savings and also weight savings to the overall passenger seat.

In the following, further examples are described to facilitate the understanding of the invention:

Example 1. A passenger seat assembly comprising: a seat base; and a backrest connected to the seat base and comprising a frame component, wherein the frame component comprises a tubular frame component having a variable inner diameter such that a first portion of the tubular frame component comprises a first wall thickness and a second portion of the tubular frame component comprises a second wall thickness that is different from the first wall thickness.

Example 2. The passenger seat assembly of any of the preceding or subsequent examples, wherein the first portion of the tubular frame component is a bent portion bending the frame component at a non-zero angle within a plane defined by the backrest.

Example 3. The passenger seat assembly of any of the preceding or subsequent examples, wherein the plane is a first plane, wherein the backrest defines a second plane, wherein the bent portion is a first bent portion, and wherein the second portion of the tubular frame component is a second bent portion bending the frame component at a non-zero angle within a second plane defined by the backrest.

Example 4. The passenger seat assembly of any of the preceding or subsequent examples, wherein the backrest comprises an upper end and a lower end, wherein the first portion at least partially forms the lower end of the backrest, and wherein the second portion at least partially forms the upper end of the backrest.

Example 5. The passenger seat assembly of any of the preceding or subsequent examples, wherein the tubular frame component further comprises a third portion between the first portion and the second portion, and wherein the third portion of the tubular frame component comprises a third wall thickness that is greater than the first wall thickness and less than the second wall thickness.

Example 6. The passenger seat assembly of any of the preceding or subsequent examples, wherein the first wall thickness and the second wall thickness are between about 0.006 inches and about 0.25 inches.

Example 7. The passenger seat assembly of any of the preceding or subsequent examples, wherein the tubular frame component comprises at least one of aluminum, magnesium, titanium, or steel.

Example 8. A frame component for a passenger seat assembly, the frame comprising a tubular frame component comprising: an inner surface and an outer surface, wherein a distance from the inner surface to the outer surface is a thickness of the tubular frame component; a first portion; and a bent portion bending the frame component at a non-zero angle within a plane, and wherein the thickness of the bent portion of the tubular frame component is different from the thickness of the first portion of the tubular frame component.

Example 9. The frame component of any of the preceding or subsequent examples, wherein the thickness of the bent portion of the tubular frame component is greater than the thickness of the first portion of the tubular frame component.

Example 10. The frame component of any of the preceding or subsequent examples, wherein the first portion is a non-bent portion of the tubular frame component.

Example 11. The frame component of any of the preceding or subsequent examples, wherein the thickness of the tubular frame component is from about 0.006 inches to about 0.25 inches.

Example 12. The frame component of any of the preceding or subsequent examples, wherein the bent portion is a first bent portion and the plane is a first plane, wherein the tubular frame component further comprises a second bent portion bending the frame component at a non-zero angle within a second plane, and wherein the thickness of the second bent portion of the tubular frame component is different from the thickness of the first portion of the tubular frame component.

Example 13. The frame component of any of the preceding or subsequent examples, wherein the first portion is between the first bent portion and the second bent portion.

Example 14. The frame component of any of the preceding or subsequent examples, wherein the thickness of the second bent portion is greater than the thickness of the first portion and less than the thickness of the second bent portion.

Example 15. A frame for a passenger seat assembly, the frame comprising a tubular frame component comprising: a first portion; and a bent portion bending the tubular frame component at a non-zero angle within a plane, wherein the tubular frame component comprises a variable inner diameter such that the first portion of the tubular frame component comprises a first wall thickness and the bent portion of the tubular frame component comprises a second wall thickness that is different from the first wall thickness.

Example 16. The frame of any of the preceding or subsequent examples, wherein the bent portion is a first bent portion and the plane is a first plane, wherein the tubular frame component further comprises a second bent portion bending the tubular frame component at a non-zero angle within a second plane and comprising a third wall thickness.

Example 17. The frame of any of the preceding or subsequent examples, wherein the third wall thickness is less than at least one of the first wall thickness or the second wall thickness.

Example 18. The frame of any of the preceding or subsequent examples, wherein the first portion is between the first bent portion and the second bent portion, and wherein the third wall thickness is less than both the first wall thickness and the second wall thickness.

Example 19. The frame of any of the preceding or subsequent examples, wherein the first wall thickness and the second wall thickness are less than or equal to about 0.25 inches.

Example 20. The frame of any of the preceding or subsequent examples, wherein the frame comprises at least one of a backrest frame or a luggage bar frame.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
   a seat base; and
   a backrest connected to the seat base and comprising a frame, wherein the frame comprises a tubular frame component having a variable inner diameter such that a first portion of the tubular frame component comprises a first wall thickness and a second portion of the tubular frame component comprises a second wall thickness that is different from the first wall thickness, and wherein the tubular frame component further comprises a transition portion between the first portion and the second portion, the transition portion having a changing wall thickness increasing or decreasing in thickness between the first portion and the second portion;
   wherein the first portion of the tubular frame component is a first bent portion bending the frame at a nonzero angle within a first plane defined by the backrest,
   wherein the backrest defines a second plane, and wherein the second portion of the tubular frame component is a second bent portion bending the frame at a nonzero angle within a second plane defined by the backrest,
   wherein the tubular frame component further comprises a third bent portion bending the frame at a nonzero angle within a third plane, wherein the third plane is different than the first plane and the second plane, and
   wherein the second bent portion further comprises a third wall thickness that is different from the thickness of the first bent portion, the transition portion, and the first portion.

2. The passenger seat assembly of claim 1, wherein the backrest comprises an upper end and a lower end, wherein the first portion at least partially forms the lower end of the backrest, and wherein the second portion at least partially forms the upper end of the backrest.

3. The passenger seat assembly of claim 1, wherein the tubular frame component further comprises a third portion between the first portion and the second portion, and wherein the third portion of the tubular frame component comprises a third wall thickness that is greater than the first wall thickness and less than the second wall thickness.

4. The passenger seat assembly of claim 1, wherein the first wall thickness and the second wall thickness are between about 0.006 inches and about 0.25 inches.

5. The passenger seat assembly of claim 1, wherein the tubular frame component comprises at least one of aluminum, magnesium, titanium, or steel.

6. A frame for a passenger seat assembly, the frame comprising a tubular frame component comprising:
   an inner surface and an outer surface, wherein a distance from the inner surface to the outer surface is a thickness of the tubular frame component;
   a first portion; and
   a bent portion bending the frame at a non-zero angle with a plane, and
   wherein the thickness of the bent portion of the tubular frame component is different from the thickness of the first portion of the tubular frame component,
   wherein a transition portion is between the first portion and the bent portion, the transition portion having an increasing or decreasing thickness between the first portion and the bent portion,
   wherein the bent portion is a first bent portion and the plane is a first plane, wherein the tubular frame component further comprises a second bent portion bending the frame at a nonzero angle within a second plane, wherein the tubular frame component further comprises a third bent portion bending the frame at a nonzero angle within a third plane, wherein the third plane is different than the first plane and the second plane, and
   wherein the second bent portion further comprises a thickness that is different from the thickness of the first bent portion, the transition portion, and the first portion.

7. The frame of claim 6, wherein the thickness of the first bent portion of the tubular frame component is greater than the thickness of the first portion of the tubular frame component.

8. The frame of claim 7, wherein the first portion is a non-bent portion of the tubular frame component.

9. The frame of claim 6, wherein the thickness of the tubular frame component is from about 0.006 inches to about 0.25 inches.

10. The frame of claim 6, wherein the first portion is between the first bent portion and the second bent portion.

11. The frame of claim 6, wherein the thickness of the second bent portion is greater than the thickness of the first portion and less than the thickness of the first bent portion.

12. A frame for a passenger seat assembly, the frame comprising a tubular frame component comprising:
   a first portion; and
   a bent portion bending the frame at a non-zero angle with a plane,
   wherein the tubular frame component comprises a variable inner diameter such that the first portion of the tubular frame component comprises a first wall thickness and the bent portion of the tubular frame component comprises a second wall thickness that is different from the first wall thickness,
   wherein a transition portion is between the first portion and the bent portion, the transition portion having an increasing or decreasing thickness between the first portion and the bent portion,
   wherein the bent portion is a first bent portion and the plane is a first plane, wherein the tubular frame component further comprises a second bent portion bending the frame at a nonzero angle within a second plane, wherein the tubular frame component further comprises a third bent portion bending the frame at a nonzero angle within a third plane, wherein the third plane is different than the first plane and the second plane, and
   wherein the second bent portion further comprises a third wall thickness that is different from the thickness of the first bent portion, the transition portion, and the first portion.

13. The frame of claim 12, wherein the third wall thickness is less than at least one of the first wall thickness or the second wall thickness.

14. The frame of claim 13, wherein the first portion is between the first bent portion and the second bent portion, and wherein the third wall thickness is less than both the first wall thickness and the second wall thickness.

15. The frame of claim 14, wherein the first wall thickness and the second wall thickness are less than or equal to about 0.25 inches.

16. The frame of claim 12, wherein the frame comprises at least one of a backrest frame or a luggage bar frame.

* * * * *